(12) United States Patent
Yang et al.

(10) Patent No.: US 7,333,258 B2
(45) Date of Patent: Feb. 19, 2008

(54) ELECTROCHROMIC MATERIAL

(75) Inventors: Dongfang Yang, London (CA); Lijue Xue, London (CA)

(73) Assignee: National Research Council of Canada, Ottawa, Ont ( * ) Notice: Subject to any disclaimer, the term of this patent is extended or adjusted under 35 U.S.C. 154(b) by 180 days.

(21) Appl. No.: 11/261,556

(22) Filed: Oct. 31, 2005

(65) Prior Publication Data

US 2007/0097480 A1    May 3, 2007

(51) Int. Cl.
*G02F 1/15* (2006.01)
(52) U.S. Cl. .................... 359/265; 252/515; 252/520.5
(58) Field of Classification Search ........ 359/265–275; 544/347; 345/49, 105; 348/817
See application file for complete search history.

(56) References Cited

U.S. PATENT DOCUMENTS

| | | | |
|---|---|---|---|
| 4,088,392 A | 5/1978 | Meyers | |
| 4,277,147 A | 7/1981 | Arnoldussen | |
| 4,350,414 A | 9/1982 | Takahashi et al. | |
| 5,142,406 A | 8/1992 | Lampert et al. | |
| 5,157,540 A | 10/1992 | Kidai et al. | |
| 5,321,544 A | 6/1994 | Parkhe et al. | |
| 5,666,771 A | 9/1997 | Macquart et al. | |
| 5,724,175 A | 3/1998 | Hichwa et al. | |
| 5,959,762 A | 9/1999 | Bandettini et al. | |
| 6,395,350 B1 | 5/2002 | Balkus, Jr. et al. | |
| 6,426,827 B1 | 7/2002 | Bonhote et al. | |
| 6,515,787 B1 | 2/2003 | Westfall et al. | |
| 6,605,239 B2 | 8/2003 | Fitzmaurice et al. | |
| 6,822,778 B2* | 11/2004 | Westfall et al. ............. | 359/265 |
| 2002/0041443 A1 | 4/2002 | Varaprasad et al. | |
| 2003/0020143 A1 | 1/2003 | Shimizu et al. | |
| 2003/0227664 A1 | 12/2003 | Agrawal et al. | |

FOREIGN PATENT DOCUMENTS

EP    1152285 A2    11/2001

OTHER PUBLICATIONS

Abstract of JP 5406028. Shoichi et al. May 15, 1979.
Abstract of JP 02151838. Tamotsu et al. Jun. 11, 1990.
Abstract of JP 10253995. Kiyoshi et al. Sep. 25, 1998.
Yang, Dongfang, et al. Proceedings of the Fifth International Workshop on Advanced Manufacturing Technologies. May 16-18, 2005. pp. 219-223.
Yang, D. et al., The Solid Films, 469-470 (2004) pp. 54-58. Available on-line Sep. 12, 2004.
Granqvist, C.G., Handbook of Inorganic Electrochromic Materials (Elsevier, Amsterdam, 1995) pp. 225-235.
Fu, Zheng-Wen, et al. J. Electrochem. Soc. 146 (2000) 2371-2374.

(Continued)

*Primary Examiner*—Ricky Mack
*Assistant Examiner*—Tuyen Tra
(74) *Attorney, Agent, or Firm*—Hans Koenig

(57) ABSTRACT

An electrochromic material having improved durability and more pleasing color characteristics is composed of a single-phase compound of formula $W_{1-x}Ta_xO_{3-x/2}$, x having a value in a range of from about 0.15 to about 0.5. Thin films of the electrochromic material can be manufactured by pulse laser deposition (PLD). Thin films of the electrochromic material are useful in the fabrication of electrochromic devices, such as "smart" windows, mirrors, information displays and variable emittance surfaces.

19 Claims, 6 Drawing Sheets

OTHER PUBLICATIONS

Huang, S. et al. Proc. Soc. Photo-Opt. Instrum. Engr. 823 (1987) pp. 159-164.
Machida, N. J. et al. Electrochem. Soc. 133 (1986) pp. 1963-1966.
Gottsche, J. et al. Proc. Soc. Photo-Opt. Instrum. Engr. 1728 (1992) pp. 13-25.
Hashimoto, S. et al J. Electrochem. Soc. 138 (1991) pp. 2403-2408.
Yanovskya, M.I. et al. J. Non-Cryst. Solids 124 (1990) pp. 155-165.
Da Costa, E., et al. J. of Materials Science 36 (2001) pp. 1407-1410.
Gillet, P.A., et al. Mat. Res. Bull. 27 (1992) pp. 1145-1152.
Gillet, P.A. et al., Proc. Soc. Photo-Opt. Instrum. Engr. 1728 (1992) pp. 82-91.
Hubler, G.K. et al. (ed.), Pulsed Laser Deposition. (John Wiley, New York, 1994) Chapter 13, pp. 327-355.
Rougier, A. et al. Applied Surface Science 153 (1999) pp. 1-9.
Ding, F., et al. Electrochemical and Solid State Letters 2(8) (1999) pp. 418-419.
Rubin, M. et al. Solar Energy Materials and Solar Cells 54 (1998) pp. 49-57.
Liu, Z.L., et al. J. Vac. Sci. Technol. A 19(3) (2001) pp. 887-892.
Rubin, M. et al. Solar Energy Materials and Solar Cells. 54 (1998) pp. 59-66.
Fu, Z., et al. Science in China (Seires B). 42(5) (1999) pp. 493-500.
Fu, Z., et al. J. Electrochem. Soc. 147(12) (2000) pp. 4610-4614.
Fu, Z. et al. J. Electrochem. Soc. 147(6) (2000) pp. 2371-2374.
Krumeich, F., et al., Journal of Solid State Chemistry. 124 (1996) 58-64.
Powder Diffraction File-2 Database. Joint Committee on Powder Diffraction Standards, International Centre for Diffraction Data, USA, 1996. Entry for tungsten oxide.
Kudo, T., et al. Journal of Solid State Chemistry. 77 (1988) pp. 412-415.
Granqvist, C.G., et al. Handbook of Inorganic Electrochromic Materials. (Elsevier, Amsterdam, 1995) pp. 508-513.

* cited by examiner

ELECTROCHROMIC MATERIAL

FIELD OF THE INVENTION

The present invention is related to electrochromic materials and devices utilizing electrochromic materials.

BACKGROUND OF THE INVENTION

An average household spends over 40 percent of its annual energy budget on heating and cooling costs. Office buildings now account for about one-third of all the energy used in the U.S., a quarter of which is lost through the inefficiency of standard windows to retain heat in the winter or deflect heat in the summer. 'Smart' window has the capability to be tuned or dimmed, to permit desired amount of light to pass through it. Therefore, it will allow more sunlight into the rooms during the winter and block most of it during the summer. As a result, 'Smart' windows that can significantly minimize the energy consumption of residence and office buildings are in great demand. It is estimated that $11 billion to $20 billion dollars a year savings in heating, lighting and air-conditioning costs can be realized if the "smart windows" replace the regular windows. "Smart windows" also boast other benefits, such as increased comfort, light and view, and decreased condensation. Residents are given control over their privacy and environment, and harmful ultraviolet rays are blocked, thereby minimizing the fading of furniture, carpets, drapes, artwork and other valuables. The cost of blinds, curtains and drapes are also significantly reduced or, in many cases, even eliminated.

Presently, three distinct 'smart' window technologies are positioning themselves for this endeavor, competing for shares of a global architectural glass market that produces an estimated 20 billion square feet of flat glass each year. Three 'smart' window technologies are liquid crystal, electrochromic, and suspended particle devices.

Switchable windows using Polymer Dispersed Liquid Crystals (PDLCs) can change from clear to opaque with the flip of a switch. In the opaque state, the glass diffuses direct sunlight and eliminates 99 percent of the ultraviolet rays responsible for the fading of carpets and curtains. Most uses of PDLCs, however, are confined to privacy applications, where popular uses are found in glass walls for offices, conference rooms, lobbies, and store-fronts. Privacy glass also provides unique opportunities for use by homebuilders in bathrooms, entryways, family rooms, bedrooms, and skylights. Liquid crystal technology has not been a commercial success. The windows are hazy because they scatter rather than absorb light, so there is a fog factor even when the device is in the transparent state. Also, while liquid crystals work well for interior privacy control, the technology only provides two statuses: clear or opaque, nothing between—it can't be used as a shading device. In addition, it also tends to be a little expensive for most popular applications, running between $85 and $150 per square foot.

Suspended Particle Device (SPD) technology works in such a way that there are millions of black, light-absorbing, suspended-particle devices (SPD) within a film placed between glass layers. When an increased voltage of electricity is applied to the film, the SPDs line up and become perpendicular to the window, which allows more light to pass through and increases visibility until the window is completely clear. As the amount of voltage is decreased, the window becomes darker until it reaches a bluish-black color that allows no light to pass through it. Therefore, a user has complete control over the amount of transmitted light from the glass or plastic walls. Windows in homes and office buildings, skylights and sun roofs, automobile dashboard displays and bright, high-contrast digital displays for laptop and other electronic instruments made with this new SPD technology can now be dimmed or brightened with electronic precision to suit individual needs, allowing an infinite range of adjustment between completely dark and completely clear. SPD, which produces little or no haze in the transparent state, can be controlled either automatically by means of a photocell or other sensing or control device, or adjusted manually with a rheostat or remote control by the user. In spite of all the activity in this field, SPD windows have yet to appear on the market. Developing the technology and manufacturing processes has been long and difficult.

Electrochromic technology may attract most attention for smart windows and a larger number of companies and research organizations are trying electrochromics. Electrochromic windows can be adjusted to control the amount of light and heat passing through them. Electrochromic windows generally comprise up to seven layers of material. Three central layers (ion storage layer, ion conducting layer and electrochromic layer) are sandwiched between two layers of a transparent conductor, all of which are further sandwiched between two layers of glass or plastic. All seven layers are, of course, transparent to visible light. These windows function as the result of transport of charged ions from an ion storage layer, through an ion conducting layer into an electrochromic layer by applying certain voltage. The presence of the ions in the electrochromic layer changes its optical properties, causing it to absorb visible light, the result of which is to darken ("unbleach") the window. To reverse the process, the voltage is reversed, driving the ions in the opposite direction, out of the electrochromic layer, through the ion conducting layer, and back into the ion storage layer. As the ions migrate out of the electrochromic layer, it brightens (or "bleaches"), and the window becomes transparent again.

Electrochromic windows can also be used to help keep cars cool. An electrochromic sunroof could darken in the direct sunlight but lighten at other times, providing sunroof function while keeping the car cool. Conceivably, electrochromic rear or side windows in a vehicle could darken while the car is parked, keeping the car cool, and then lighten again once the car is started. So far the technology is used only in self-dimming rear-view mirrors that change from light to dark to prevent eyestrain and temporary blindness from the glare of headlights approaching from the rear, and then reversing when conditions permit.

In general, the electrochromic (EC) devices can be divided into two groups depending on the type of electrolyte employed in the device: lithium conducting medium or proton conducting medium of either inorganic solid-state or liquid/polymer gel type. Liquid/polymer gel type media encompass liquid type and polymer gel type media.

Existing EC devices based on solid state lithium conducting medium, unfortunately, are quite slow. It can take six seconds for something as small as an automobile's rear-view mirror to go from clear to dark, and it may take 10 seconds to return to clear. But for something the size of a window it may take six to 10 minutes to change between coloring and bleaching. Most people want instant feedback to adjust their window properly.

Since ionic diffusivity of protons is two orders of magnitude higher than that of lithium ions, much more rapid coloring and bleaching processes occur in proton conducting medium than lithium conducting medium. It is therefore more desirable to use proton conducting electrolyte for achieving fast response time.

Although inorganic solid-state EC devices can achieve better durability, its response time is relatively slow since the diffusivity of protons and lithium in solid medium is significantly lower than in liquid/polymer gel type media. However, durability is a significant concern for proton conducting liquid/polymer gel type EC devices, since the solid ion insertion layers (EC and counter electrode layer) can exhibit long-term degradation due to the contact with liquid/polymer gel type electrolytes. For example, $WO_3$, by far the most common cathodic electrochromic material, has a tendency to slowly dissolve in proton-based electrolyte, which limits its use in proton conducting liquid/polymer gel type electrolytes.

An electrochromic compound based on a mixed oxide of tungsten and tantalum has been previously reported (Yang, D. et al., *Thin Solid Films*, 469-470 (2004) 54-58). This compound has the formula $W_{0.9}Ta_{0.1}O_x$, where $x \leq 2.95$. While electrochromic properties for this compound are reported, there is no indication of cyclic durability, especially in a proton-based environment.

Therefore, there is a need for novel electrochromic materials that have increased cyclic durability and/or do not suffer from long-term degradation effects when in contact with a proton-based environment in electrochromic devices, especially in liquid/polymer gel type electrochromic devices.

SUMMARY OF THE INVENTION

There is provided an electrochromic material comprising a single-phase compound of formula $W_{1-x}Ta_xO_{3-x/2}$, x having a value in a range of from about 0.15 to about 0.5.

There is further provided a film comprising an electrochromic material comprising a single-phase compound of formula $W_{1-x}Ta_xO_{3-x/2}$, x having a value in a range of from about 0.15 to about 0.5.

There is yet further provided an electrochromic device comprising an ion storage layer, an ion conducting layer and an electrochromic layer between first and second transparent conductor layers, the electrochromic layer comprising a film of an electrochromic material, the electrochromic material comprising a single-phase compound of formula $W_{1-x}Ta_xO_{3-x/2}$, x having a value in a range of from about 0.15 to about 0.5.

Electrochromic materials of the present invention have improved durability and chemical stability, particularly in acidic electrolytes, as well as possessing a desirable neutral color in unbleached (colored) state. Particularly improved electrochromic materials preferably comprise $W_{1-x}Ta_xO_{3-x/2}$ compounds in which x has a value in a range from about 0.2 to about 0.5, with a range of from about 0.25 to about 0.35 being of particular note. Electrochromic materials of the present invention are cathodic materials.

Durability of a film of an electrochromic material of the present invention is at least about 5 times greater than that of a $WO_3$ film of similar thickness. Preferably, the durability is at least about 10 times greater, more preferably at least about 20 times greater. Such durability is of particular note in a proton-based electrolyte.

One measure of durability of an electrochromic material is cyclic durability as measured by the number of coloring/bleaching cycles that a film of the material can undergo at one $H^+$ intercalation potential and one $H^+$ deintercalation potential before optical transmittance is the same in both the bleached and unbleached (colored) states. Such a measurement may be made by subjecting films, about 250 nm thick, to $H^+$ intercalation at −0.7 V (vs. Ag/AgCl) and deintercalation at 1.1 V (vs. Ag/AgCl) in 0.1 M $H_3PO_4$. Films comprising an electrochromic material of the present invention can undergo at least 275, preferably at least 550, more preferably at least 1100, of such cycles before optical transmittance is the same for both the bleached and unbleached states. Films of $WO_3$ can undergo about 55 such cycles before optical transmittance is the same for both the bleached and unbleached states.

Electrochromic materials of the present invention may be prepared by mixing tungsten oxide ($WO_3$) with tantalum oxide ($Ta_2O_5$) followed by sintering at a temperature of from about 1200° C. to about 1500° C., preferably about 1300° C., in an oxygen atmosphere, preferably pure oxygen, preferably at a pressure of about one atmosphere. The electrochromic material is preferably then formed into a film. Films preferably have a thickness of about 200-6000 nm, more preferably about 300-4000 nm.

Films of $W_{1-x}Ta_xO_{3-x/2}$ compounds may be manufactured by physical methods such as evaporation, sputtering and laser ablation, electrochemical methods such as electrodeposition and anodization, and chemical methods such as vapor deposition, sol-gel, spray photolysis, decomposition reactions and thermal oxidation. However, for producing thin films of multi-component oxides, it is difficult to achieve desired chemical stoichiometry with most of these methods. For example, physical vapor deposition (PVD) sputtering of a single-phase mixed oxide compound may result in changing chemical stoichiometry since the individual metal oxides in the compound have different vapor pressures.

Pulsed laser deposition (PLD) is a physical vapor deposition technique capable of reproducing target composition with relative ease under appropriate conditions. Therefore, PLD is particularly suitable for preparing thin films of $W_{1-x}Ta_xO_{3-x/2}$ compounds of the present invention. Further, PLD also produces high kinetic and internal energies of the ablated species, which enhances adhesion of the films to substrates. PLD provides better control of film microstructure and morphology, which provides better control of film properties. PLD can usually operate at low processing temperatures without deterioration of film-specific properties, which is excellent for temperature-sensitive substrates. PLD techniques give less time for the tungsten and tantalum to separate into different phases, therefore, a single-phase compound can be maintained. PLD is familiar in the art and has been used in to manufacture films of other metal oxides.

In pulsed laser deposition (PLD), a powder of a compound is first pressed and sintered to form a target (e.g. a disc) and mounted on a rotating holder in a vacuum chamber proximal a heated substrate. The rotating target is ablated with a pulsed laser (e.g. an excimer laser) in oxygen to produce a plume of target material. The plume of ablated target material is condensed as a thin film on to the substrate. The oxygen pressure in the vacuum chamber is typically about 20-300 mtorr. The laser is capable of producing beams having an energy density of about $10^7$ to $10^9$ W/cm². The substrate is typically heated to a temperature in a range of about 25-800° C. Films produced in this manner can have a thickness of from about <1 nm to a few micrometers.

Electrochromic devices include, for example, windows, mirrors, information displays and variable emittance surfaces. Electrochromic devices such as windows, mirrors, information displays and variable emittance surfaces, etc. comprise layers of material. Central layers (e.g. ion storage layer, ion conducting layer, protective layer, and electrochromic layer) are sandwiched between two layers of a transparent conductor. One or both of the transparent conductor layers may be supported on a layer or layers of a transparent substrate (e.g. glass, plastic, etc.). All layers are transparent to visible light. Inner layers (ion storage layer, ion conducting layer, protective layer, electrochromic layer and transparent conductor layers) are thin preferably having a thickness of about 200-6000 nm, more preferably about 300-4000 nm. Inner layers, particularly the ion conducting layer, may be solid state or liquid/polymer gel type layers. When one of the inner layers is liquid/polymer gel type, preferably the inner layers are sandwiched between two layers of transparent substrate.

The transparent conductor layer preferably comprises a film of a transparent conducting oxide, for example indium-tin oxide (ITO), indium oxide, tin oxide, and tin oxide doped with zinc. The electrochromic layer comprises a film of the electrochromic material of the present invention. The ion storage layer preferably comprises a film of nickel oxide (NiO), vanadium oxide ($V_2O_5$) or iridium oxide (IrO).

The ion conducting (electrolyte) layer comprises an electrolyte. The electrolyte layer may be a solid state or a liquid/polymer gel type layer depending on the type of electrolyte used. For liquid type layers, an electrolyte is typically dissolved in a liquid solvent, for example, water or organic solvents (e.g. propylene carbonate, dimethylsulfite, nitromethane, etc.). For polymer gel type layers, an electrolyte is typically dispersed in a gel-forming polymeric matrix.

Any suitable electrolyte may be used, for example, lithium-containing electrolytes or proton-based electrolytes. Proton-based electrolytes are preferred since ionic diffusivity of protons is about two orders of magnitude higher than that of lithium ions, thereby making the coloring/bleaching processes of an electrochromic device much faster.

Lithium-containing electrolytes include, for example, $LiClO_4$/propylene carbonate liquid electrolyte, a polymer gel-type electrolyte comprising $LiClO_4$ with γ-butyrolactone (GBL) and crosslinked methacrylated polyethylene oxide, oxymethylene-linked polyethylene glycol or amorphous polyethylene oxide with lithium trifluoromethylsulfonyl imide (LiTFSI), $LiAlF_4$, $LiNbO_3$, etc.

Proton-based electrolytes include, for example, Nafion™, polyacrylamido-methyl-propane sulfonic acid (poly-AMPS), polystyrene sulfonic acid (poly-SSA), polyethylene sulfonic acid (poly-ESA), $Ta_2O_5 \cdot pH_2O$, $SiO_2 \cdot pH_2O$, phosphotungstic acid (PWA), zirconium phosphate (ZP) and $Sn(NaH)(PO_4)_2 \cdot pH_2O$.

Liquid/polymer gel type ion conducting layers are preferred. Solid state layers are prone to having pinholes caused during the deposition of the layer. Such pinholes act as electron channels between the ion conducting layer and the electrochromic layer thereby permitting electrons to flow relatively unimpeded from the electrochromic layer to the transparent conductor layer. Such a condition is known as "shorting" and results in no coloration of the electrochromic layer. Liquid/polymer gel type ion conducting layers rarely suffer from pinholes. A drawback of liquid/polymer gel type ion conducting layers has been the long-term degradation of the electrochromic layer due to contact with liquid/polymer gel type electrolyte. Since the electrochromic materials of the present invention are more durable and chemically stable, this degradation problem is reduced and liquid/polymer gel type ion conducting layers become more desirable.

Protective layers may be utilized between the ion conducting layer and the electrochromic layer. For example, inorganic films, such as $Ta_2O_5$, $Sb_2O_5$, or nonporous polymer films, such as ultravioelt light-cured plasticized poly(vinyl alcohol), may be used to coat the electrochromic layer to further protect the electrochromic layer from degradation due to contact with the ion conducting layer. Even though the electrochromic material of the present invention possesses improved cyclic durability and chemical stability and can be used without a protective layer, such protective layers are suggested to further improve durability.

An electrochromic device may be fabricated by sequentially depositing thin films of the required layers on a transparent substrate to form a monolithic device. Deposition of thin films may be achieved by generally known techniques, for example, physical methods such as evaporation, sputtering and laser ablation, electrochemical methods such as electrodeposition and anodization, and chemical methods such as vapor deposition, sol-gel, spray photolysis, decomposition reactions and thermal oxidation. For example, one side of a transparent substrate may be coated with a thin film of transparent conductor (e.g. indium tin oxide (ITO)) by electron beam evaporation. Then, an ion storage layer may be formed on the transparent conductor by depositing a thin film of an ion storage material (e.g. nickel oxide (NiO)) by electron beam evaporation. An ion conducting (electrolyte) layer is then deposited on the ion storage layer by electron beam evaporation and the electrochromic material deposited on the ion conducting layer by pulsed laser deposition. A second transparent conductor layer may then be deposited by electron beam evaporation on the elctrochromic layer. Electrochromic devices may also be built up in the reverse order. The sequence of layering to assemble the device could be performed in a variety of different ways given the appropriate techniques, provided the layers are appropriately ordered to function in the device. For example, in another method of fabricating an electrochromic device, a first transparent conductor layer is deposited on a first transparent substrate, an ion storage layer is deposited on the first transparent conductor layer, a second transparent conductor layer is deposited on a second transparent substrate, an electrochromic layer is deposited on the second transparent conductor layer, disposing the first transparent substrate coated with the first transparent conductor layer and the ion storage layer next to the second transparent substrate coated with the second transparent conductor layer and the electrochromic layer to provide a void between the two coated substrates, and inserting a liquid or polymer gel ion conducting layer into the void.

Electrochromic devices, such as windows, etc., function as the result of transport of charged ions (usually $Li^+$ or $H^+$) from the ion storage layer, through the ion conducting layer into the electrochromic layer by applying certain voltage. The presence of the ions in the electrochromic layer changes its optical properties, causing it to absorb visible light, the result of which is to darken ("unbleach") the window. To reverse the process, the voltage is reversed, driving the ions in the opposite direction, out of the electrochromic layer, through the ion conducting layer, and back into the ion storage layer. As the ions migrate out of the electrochromic layer, it brightens (or "bleaches"), and the window becomes transparent again.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

EXAMPLE 1

Preparation of $W_{1-x}Ta_xO_{3-x/2}$ Films $W_{1-x}Ta_xO_{3-x/2}$ films were deposited by ablating a 90 mm diameter rotating $W_{1-x}Ta_xO_{3-x/2}$ target ($Ta_{0.1}W_{0.9}O_{2.95}$, 99.9%, from SCI Engineered Materials, $Ta_{0.3}W_{0.7}O_{2.85}$, 99.95%, and $WO_3$, 99.99% both from Super Conductor Materials) in an advanced deposition chamber (PVD Inc., PLD-3000) by means of a pulsed KrF excimer laser (λ=248 nm, Lambda Physik, LPX-210i), at a repetition rate of 50 Hz. The laser beam was focused down to a spot size of about 4 mm² on the target surface and the on-target laser beam fluence was adjusted to about 2 to 3 J/cm². A 25 mm×50 mm×1.1 mm rectangle indium tin oxide (ITO) coated glass (unpolished float glass, $SiO_2$ passivated/ITO coated one surface, $R_s$=6±2Ω, $SiO_2$ layer thickness: 20-30 nm, ITO layer thickness: 150-200 nm, Delta Technologies, Limited) was used as the substrate for the deposition. To achieve uniform deposition over the entire substrate surface, the laser beam was rastered over the radius of the rotating target.

Before introducing an ITO substrate into the deposition chamber, it was ultrasonicated in acetone and isopropanol to remove adsorbed organic contaminations. After loading, the process chamber was pumped down below 2.67×10⁻⁴ Pa using a turbo-molecular pump. A blackbody-type heater that used quartz lamps on the top of the substrate allowed non-contact, radiation-based heating. When the temperature reached a pre-set value, oxygen gas (99.995%, Air Liquide) was introduced into the chamber and its flow was controlled through a mass-flow controller to achieve a pre-set oxygen gas pressure of 5.32 Pa. The laser was then turned on and a pre-cleaning cycle of the target was performed for two minutes. Subsequently, the shutter that hid the substrate surface from the ablation plume was opened and the deposition started. After a predetermined processing time, the laser was stopped and the substrate was allowed to cool down. Deposition time for $Ta_{0.1}W_{0.9}O_{2.95}$ and $WO_3$ films was 10 minutes and for $Ta_{0.3}W_{0.7}O_{2.85}$ was 30 minutes. Film thicknesses determined by using a fiber-optic-based spectrophotometer (Scientific Computing International, Film Tek 3000) for all three materials were about 250 nm.

EXAMPLE 2

Structural Characterization of $W_{1-x}Ta_xO_{3-x/2}$ Films

Figure 1:
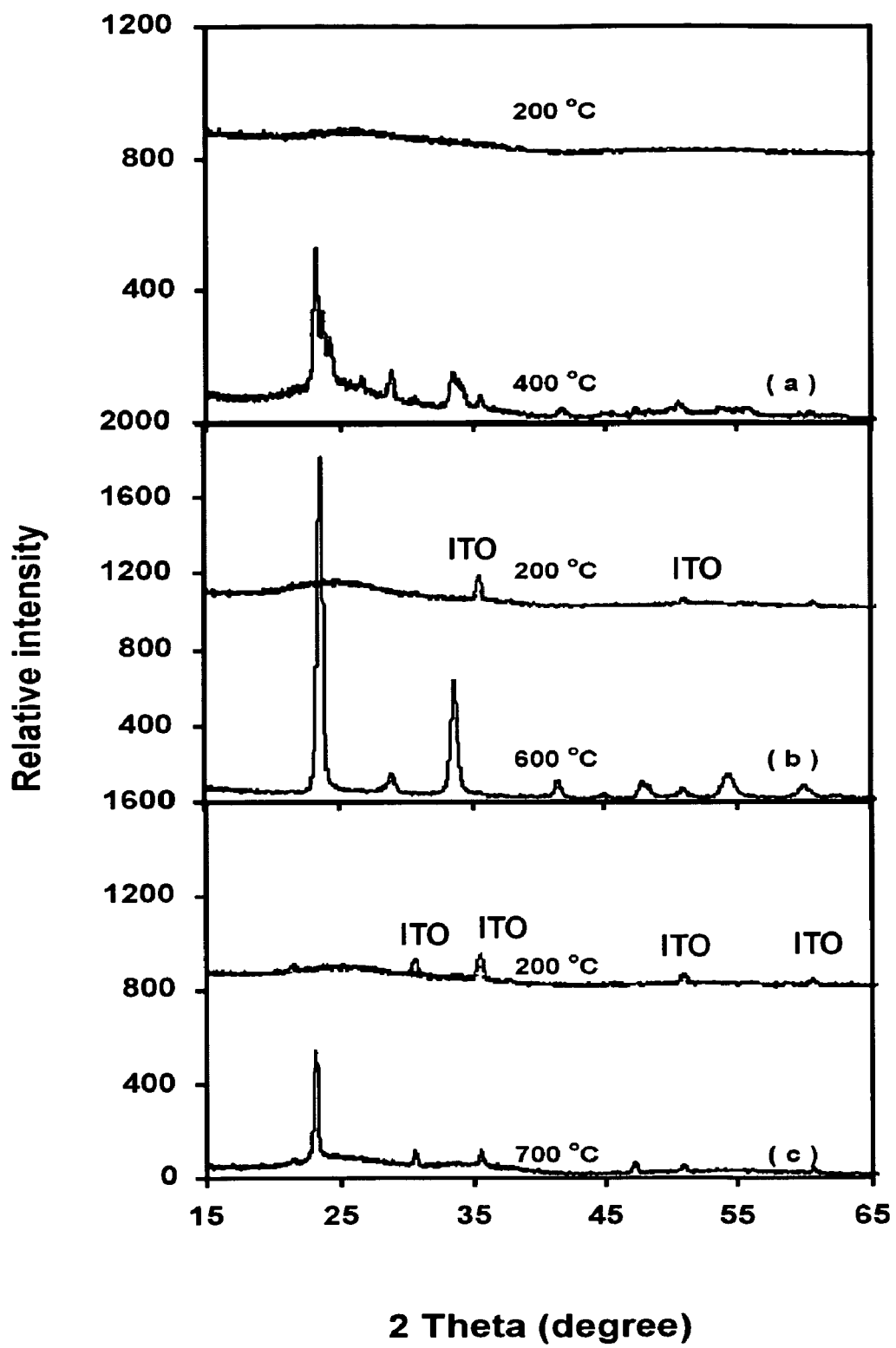
FIG. 1 shows XRD spectra of (a) $WO_3$ deposited at substrate temperatures of 200° C. and 400° C.; (b) $Ta_{0.1}W_{0.9}O_{2.95}$ film deposited at substrate temperatures of 200° C. and 600° C., and (c) $Ta_{0.3}W_{0.7}O_{2.85}$ films deposited at substrate temperatures of 200° C. and 700° C. on ITO-coated glass substrate in $O_2$ pressure of 5.32 Pa.

Structures of the films were examined by X-ray diffraction (XRD, Philips, X-Pert MRD) using monochromatized Cu $K_\alpha$ in the $\theta_0$-2θ thin film configuration, where $\theta_0$ was fixed at 1°. FIG. 1 shows XRD patterns of $WO_3$, $Ta_{0.1}W_{0.9}O_{2.95}$ and $Ta_{0.3}W_{0.7}O_{2.85}$ films deposited in 5.32 Pa of oxygen at 200° C. and their respective crystallization temperatures. At substrate temperatures of 200° C., XRD patterns of all the three materials consist of a diffuse-scattering curve with a broad band centered at 2θ of about 25°. Such a profile indicates an amorphous-like structure. Besides the broad band, a few small peaks originated from ITO layer also appear as indicated in the figure. By increasing the substrate temperatures, $WO_3$ film begins to crystallize at 400° C., while $Ta_{0.1}W_{0.9}O_{2.95}$ crystallizes at 600° C and $Ta_{0.3}W_{0.7}O_{2.85}$ at 700° C., respectively. As the Ta content x increases, higher temperatures are required to form crystalline structures.

XRD data and peaks assignment of crystalline $WO_3$ phase, crystalline $Ta_{0.1}W_{0.9}O_{2.95}$ phase and crystalline $Ta_{0.3}W_{0.7}O_{2.85}$ phase are given in Table 1.

TABLE 1

X-ray diffraction data for $WO_3$ film deposited at 400° C. in 5.32 Pa $O_2$, $Ta_{0.1}W_{0.9}O_{2.95}$ film deposited at 600° C. in 5.32 Pa $O_2$ and $Ta_{0.3}W_{0.7}O_{2.85}$ film deposited at 700° C. in 5.32 Pa $O_2$ on ITO-coated glass substrate.

|  | 2θ | $D_{hkl}$ (Å) | Identified planes (hkl) |
|---|---|---|---|
| $WO_3$ | 23.23 | 0.83 | (002) |
|  | 23.73 | 0.75 | (020) |
|  | 24.27 | 0.66 | (200) |
|  | 26.72 | 0.33 | (121) |
|  | 28.87 | 0.09 | (112) |
|  | 33.41 | 0.68 | (022) and/or (202) |
|  | 34.26 | 0.62 | (202) and/or (220) |
|  | 35.50 | 0.53 | (122) and/or (122), (212) |
|  | 41.72 | 0.16 | (222) and/or (222) |
|  | 45.30 | 0.00 | (312) and/or (321) |
|  | 47.37 | 0.92 | (004) |
|  | 48.42 | 0.88 | (040) |
|  | 50.05 | 0.82 | (400) and/or (140) |
|  | 50.62 | 0.80 | (114) and/or (114) |
|  | 53.65 | 0.71 | (024) and/or (204) |
|  | 55.85 | 0.64 | (142) and/or (420) |
| $Ta_{0.1}W_{0.9}O_{2.95}$ | 23.68 | 0.75 | (110) |
|  | 28.91 | 0.08 | (101) |
|  | 33.60 | 0.66 | (111) and/or (200) |
|  | 41.42 | 0.18 | (201) |

TABLE 1-continued

X-ray diffraction data for $WO_3$ film deposited at 400° C.
in 5.32 Pa $O_2$, $Ta_{0.1}W_{0.9}O_{2.95}$ film deposited at 600° C.
in 5.32 Pa $O_2$ and $Ta_{0.3}W_{0.7}O_{2.85}$ film deposited at 700° C.
in 5.32 Pa $O_2$ on ITO-coated glass substrate.

|  | 2θ | $D_{hkl}$ (Å) | Identified planes (hkl) |
|---|---|---|---|
|  | 44.89 | 0.02 | (211) |
|  | 47.78 | 0.90 | (002) |
|  | 48.23 | 0.89 | (220) |
|  | 54.36 | 0.69 | (310) |
|  | 60.01 | 0.54 | (311) |
|  | 62.45 | 0.49 | (212) |
| $Ta_{0.3}W_{0.7}O_{2.85}$ | 23.17 | 0.84 | (100) |
|  | 33.56 | 0.67 | (110) |
|  | 39.80 | 0.26 |  |
|  | 43.73 | 0.07 |  |
|  | 47.37 | 0.92 | (200) |
| ITO | 21.51 | 0.13 |  |
|  | 30.57 | 0.92 | (222) |
|  | 35.46 | 0.52 | (320) |
|  | 37.70 | 0.38 | (331) |
|  | 50.92 | 0.79 | (441) |
|  | 60.67 | 0.53 | (622) |

The XRD pattern of 400° C. $WO_3$ film is believed to originate from both an amorphous structure represented by a broad band centered at 2θ of about 25° and a monoclinic polycrystalline structure represented by those sharp peaks (ICDD 43-1035). The average lattice constants of the monoclinic structure calculated from the data in Table 1 are: a=0.733 nm, b=0.749, c=0.765 nm and β=90.04°. The values are very close to those of bulk $WO_3$ known in the art, where a=0.7297 nm, b=0.7539, c=0.7688 nm and β=90.9° were found.

$Ta_{0.1}W_{0.9}O_{2.95}$ crystallized at around 600° C. and its XRD pattern can be assigned to the tetragonal crystal structure (ICDD 45-0115). The average lattice constants of the film calculated from the data in Table 1 are: a=0.533 nm and c=0.379 nm. The values are similar to known values for bulk $Ta_{0.1}W_{0.9}O_{2.95}$ obtained from thermal decomposition of Ta-doped peroxo-polytungstic acids at 750-900° C. in air, where a=0.5319 nm, and c=0.3814 nm were found.

$Ta_{0.3}W_{0.7}O_{2.85}$ film crystallizes at around 700° C. XRD pattern of $Ta_{0.3}W_{0.7}O_{2.85}$ film formed at 700° C. can be assigned to a mixture of an amorphous structure (represented by the broad band centered at 2θ of about 25°) and a cubic crystal structure (ICDD, PDF# 45-0116). The strong peak located at 2θ=23.2° and two weak peaks locating at 2θ=33.6 and 47.4 are attributed to the cubic crystal structure. The average lattice constant of the film calculated from the data corresponding to the (100) and (200) peaks in Table 1 is: a=0.384 nm. The value is also very close to known values for bulk $Ta_{0.3}W_{0.7}O_{2.85}$ obtained from thermal decomposition of Ta-doped peroxo-polytungstic acids at 750-900° C. in air, where a=0.382 nm was found. Assignments of the XRD peaks for the ITO glass are also given in Table 1.

The results in FIG. 1 and Table 1 clearly show that by introducing Ta into $WO_3$ lattice, the degree of symmetry increases rather than decreases: crystallized $WO_3$ has a monoclinic structure, while $Ta_{0.1}W_{0.9}O_{2.95}$ has a tetragonal structure, and $Ta_{0.3}W_{0.7}O_{2.85}$ has a cubic structures. Lattice constants decrease as the Ta content x increases, indicating that the bond lengths between the W/Ta atoms and O atoms are significantly reduced and stronger bonds between metal atoms and oxygen atoms are formed.

EXAMPLE 3

Electrochromic Properties of $W_{1-x}Ta_xO_{3-x/2}$ Films

Electrochromic property tests were performed in an electrochemical-optical cell consisting of a Pt ring counter electrode and an Ag/AgCl reference electrode both sandwiched in between the coated ITO glass working electrode and a quartz window. The cell allows electrochemical measurements using a Gamry PC3 potentiostat and optical transmittance measurements using a fiber-optic-based spectrophotometer to be carried out simultaneously: $H^+$ intercalation and deintercalation of $W_{1-x}Ta_xO_{3-x/2}$ films were accomplished by varying the electrical potential of the films between −0.7 V (vs. Ag/AgCl) and +1.1 V (vs. Ag/AgCl) in 0.1 M $H_3PO_4$ electrolyte at a frequency of 0.01 Hz. Spectral transmittance of the film (plus a thin electrolyte layer of 6 mm thick and the quartz window of 3 mm thick) was measured in-situ using the spectrophotometer in the 250-850 nm ranges. The surface area of the films in contact with electrolyte is 4.1 $cm^2$.

Electrochromic properties were measured for the $WO_3$, $Ta_{0.1}W_{0.9}O_{2.95}$ and $Ta_{0.3}W_{0.7}O_{2.85}$ films deposited at 200° C. in 5.32 Pa $O_2$. The kinetics of $H^+$ ion intercalation and deintercalation was investigated by the chronoamperometry method: initially, the electrical potential of $WO_3$ or $W_{1-x}Ta_xO_{3-x/2}$ film was hold at 1.1 V (vs. Ag/AgCl) for 50 seconds, and then the electrical potential was stepped to −0.7 V (vs. Ag/AgCl) where the $H^+$ ion intercalation into the film occurs, the electrical current (negative) associated with the $H^+$ ion intercalation process was recorded as a function of time. After 50 seconds (a period long enough to finish the intercalation process) at −0.7 V, the electrical potential was stepped back to 1.1 V (vs. Ag/AgCl) where the $H^+$ ion deintercalation from the film occurs, the electrical current (positive) associated with the $H^+$ ion deintercalation process was also recorded as a function of time for 50 seconds (a period long enough to finish the deintercalation process). This potential stepping process was repeated for more than 1.5 hours.

Figure 2:
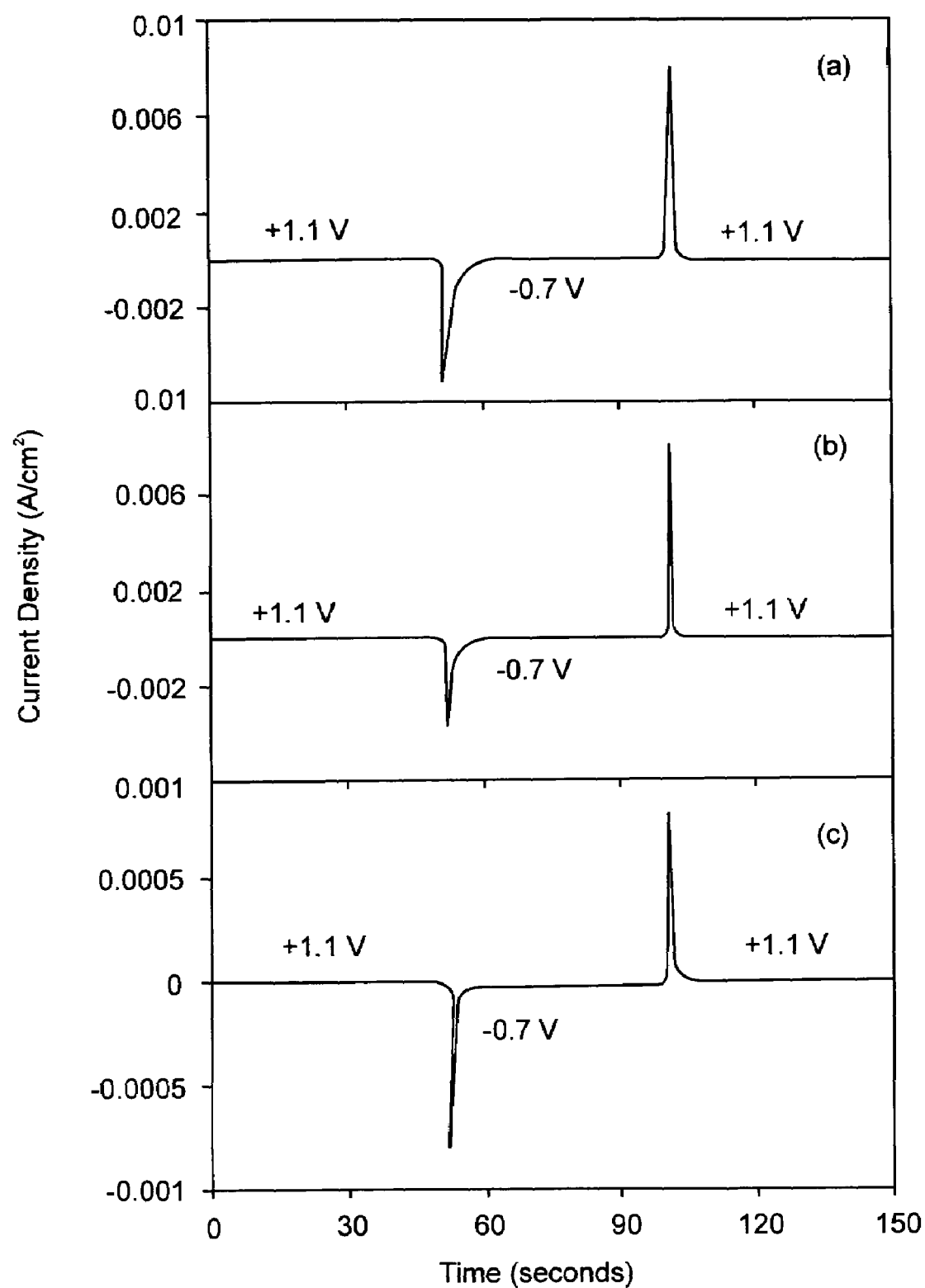
FIG. 2 shows a graph of electrical current density transient at the first color/bleach cycle for $H^+$ intercalation (at −0.7 V) and deintercalation (at 1.1 V) processes for thin films of (a) $WO_3$, (b) $Ta_{0.1}W_{0.9}O_{2.95}$ and (c) $Ta_{0.3}W_{0.7}O_{2.85}$ films deposited at 200° C. on ITO-coated glass substrate in $O_2$ pressure of 5.32 Pa.

FIG. 2 shows electrical current density vs. time at the first color/bleach cycle for $WO_3$, $Ta_{0.1}W_{0.9}O_{2.95}$ or $Ta_{0.3}W_{0.7}O_{2.85}$ films. Integrating both current density transients gave the total intercalation charge ($Q_{in}$) and deintercalation charge ($Q_{de}$). Kinetics for the $H^+$ intercalation into the film is slower than deintercalation out of the film for all the three materials. It took about 14 seconds to reach 90% $Q_{in}$ for $WO_3$ films of about 250 nm thick at −0.7 V, while it took only 3.5 seconds to reach 90% $Q_{de}$. For the $Ta_{0.1}W_{0.9}O_{2.95}$ film of similar thickness, it took about 18.5 seconds to reach 90% $Q_{in}$ and about 2.5 seconds to reach 90% $Q_{de}$. For the $Ta_{0.3}W_{0.7}O_{2.85}$ film, the electrical current associated with the intercalation/deintercalation process is about one order of magnitude smaller than that of $WO_3$ and $Ta_{0.1}W_{0.9}O_{2.95}$ films. The electrical current due to oxidation and reduction of dissolved oxygen or decomposition of water is comparable to the current associated with intercalation/deintercalation process; therefore it is hard to precisely estimate the intercalation/deintercalation response time for the $Ta_{0.3}W_{0.7}O_{2.85}$ film, but it is evident that those valves are at the same order of magnitude as those of $WO_3$ and $Ta_{0.1}W_{0.9}O_{2.95}$ films. It is generally known that $H^+$ intercalation and deintercalation are not symmetric phenomena; intercalation is largely governed by the properties at the boundary between the electrolyte and the film, whereas deintercalation is mainly influenced by ion transport in the film. Difference in coloration speed for $WO_3$ and $W_{1-x}$ $Ta_xO_{3-x/2}$ films may be due to differences in the electrochemical environments at the boundary between the electrolyte and the films due to the difference in chemical nature of the materials. As the kinetics of deintercalation process is related to the transport of protons in the film, any difference in deintercalation time of $WO_3$ and $W_{1-x}Ta_xO_{3-x/2}$ films are related to the difference in proton transport speed inside both amorphous films at the same applied electrical potential.

The total amount of charge associated with intercalation at an electrical potential of −0.7 V or deintercalation at an electrical potential of 1.1 V was also different among the three materials. Total amount of intercalation charge for $Ta_{0.1}W_{0.9}O_{2.95}$ film is only 56% of the intercalation charge for $WO_3$ film, while for $Ta_{0.3}W_{0.7}O_{2.85}$ film it is about 14%. In order to intercalate the same amount of $H^+$ ions into $W_{1-x}Ta_xO_{3-x/2}$ films, more negative electrical potential must be applied to the films. In aqueous electrolyte, however, the negative electrical potential requirement was limited by the decomposition of water and the ITO layer, which occurs at around −0.9 V (vs. Ag/AgCl) in 0.1 M $H_3PO_4$.

As deposited amorphous $WO_3$ and $W_{1-x}Ta_xO_{3-x/2}$ films are almost colorless ($WO_3$ and $Ta_{0.1}W_{0.9}O_{2.95}$ have a very light pink color, while $Ta_{0.3}W_{0.7}O_{2.85}$ a very light green color). Under $H^+$ ion intercalation at −0.7 V (coloring) and deintercalation at 1.1 V (bleaching) in 0.1 M $H_3PO_4$ solution, the color of $WO_3$ changed from light pink to midnight blue, while $Ta_{0.1}W_{0.9}O_{2.95}$ changed from light pink to cadet blue, and $Ta_{0.3}W_{0.7}O_{2.85}$ from light green to light brown-green. When the electrical potential was stepped to +1.1V where $H^+$ ions were deintercalated from films, the transmittance of all the three materials recovered to that of the as-deposited state and shows excellent reversibility.

The color pattern for $Ta_{0.3}W_{0.7}O_{2.85}$ (i.e. 30% Ta) is particularly beneficial as the unbleached (colored) state is more pleasing to the human eye than the unbleached (colored) states for $WO_3$ and $Ta_{0.1}W_{0.9}O_{2.95}$. Such a feature makes these compounds more suitable for application in commercial devices. It is evident from the X-ray diffraction data that Ta-doped tungsten oxides transition from a tetragonal structure to a cubic structure when the amount of Ta is >20% (x≧0.2). The beneficial color pattern is thus expected to be even more pronounced for compounds having greater than 20% Ta.

Figure 3:
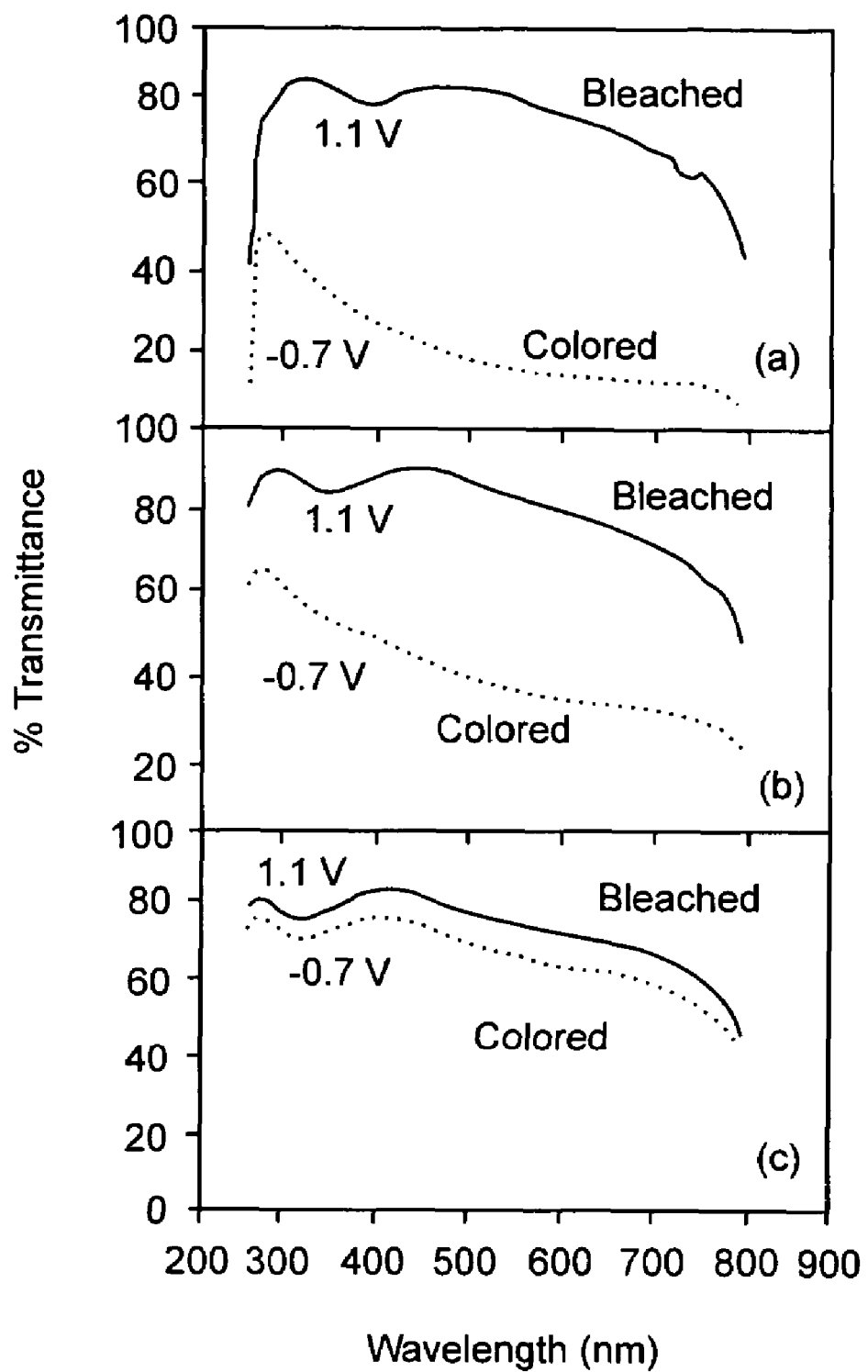
FIG. 3 shows graphs of spectral transmittance for (a) $WO_3$, (b) $Ta_{0.1}W_{0.9}O_{2.95}$ and (c) $Ta_{0.3}W_{0.7}O_{2.85}$ films (250 nm thick) deposited on ITO-coated glass substrates at 200° C. and 5.32 Pa $O_2$ subject to $H^+$ intercalation at −0.7 V (vs. Ag/AgCl) and deintercalation at 1.1 V (vs. Ag/AgCl) in 0.1 M $H_3PO_4$.

Optical spectral transmittance measured during $H^+$ ions intercalation at electrical potential −0.7 V and deintercalation at electrical potential 1.1 V is shown in FIG. 3 for $WO_3$ and $W_{1-x}Ta_xO_{3-x/2}$ films. It is clearly demonstrated that the optical transmittance of all the three materials decreases with different magnitude upon $H^+$ intercalation. Optical transmittance of $WO_3$ decreases most significantly upon $H^+$ intercalation at −0.7 V (FIG. 3a), while $Ta_{0.1}W_{0.9}O_{2.95}$ also decreases significantly but less than $WO_3$ upon $H^+$ intercalation (FIG. 3b). Optical transmittance of $Ta_{0.3}W_{0.7}O_{2.85}$ decreased only slightly upon $H^+$ intercalation (FIG. 3c). The fluctuations on the spectrum are relevant to the film thickness and originate from optical interference due to the multilayer component (e.g., ITO, $SiO_2$ and $WO_3$ or $W_{1-x}Ta_xO_{3-x/2}$ layers).

Figure 4:
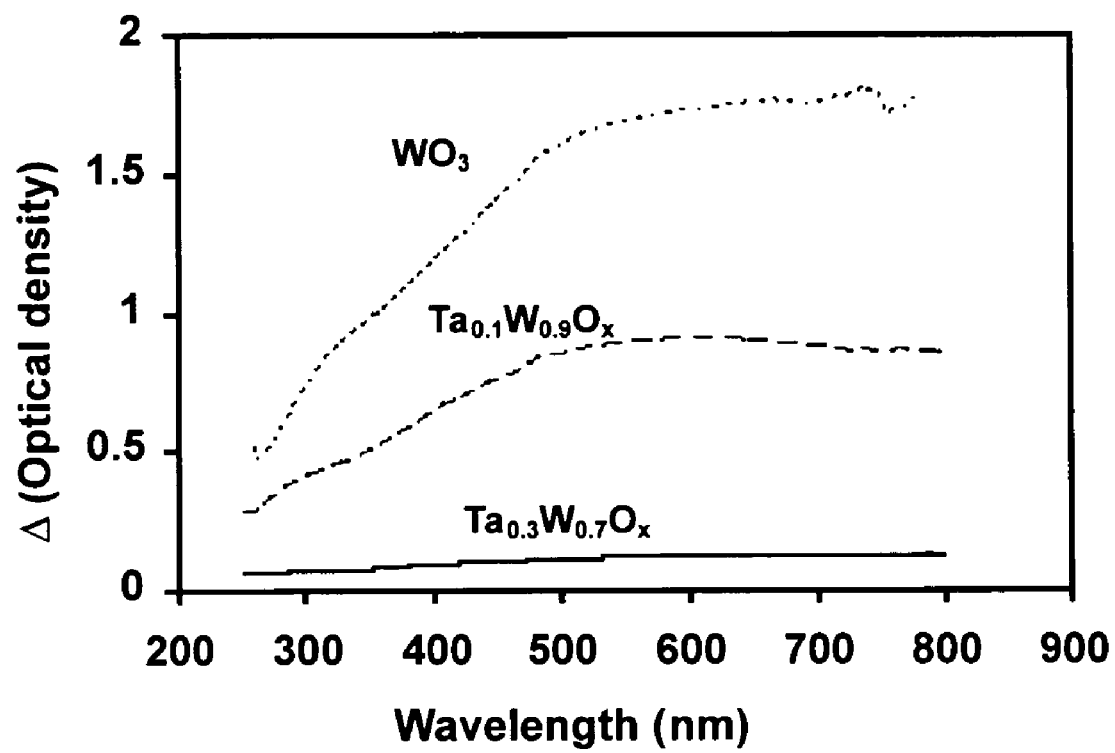
FIG. 4 shows a graph of change in optical density between colored and bleached states for $WO_3$, $Ta_{0.1}W_{0.9}O_{2.95}$ and $Ta_{0.2}W_{0.7}O_{2.85}$ films (250 nm thick) between −0.7 V and 1.1 V.

Change in optical density (=absorption coefficient×film thickness) between colored and bleached states calculated from data in FIG. 3 for $WO_3$, $Ta_{0.1}W_{0.9}O_{2.95}$ and $Ta_{0.3}W_{0.7}O_{2.85}$ films is shown in FIG. 4. For the $WO_3$ film, the change in optical density (between colored and bleached states) increases significantly as the wavelength increases from 250 nm to 500 nm, and then it increases slightly in the wavelength range 500 nm to 800 nm. For $Ta_{0.1}W_{0.9}O_{2.95}$ and $Ta_{0.3}W_{0.7}O_{2.85}$ films, the change in optical density also increase significantly as the wavelength increases from 250 nm to 500 nm, peaks at around 610 nm, and decreases slightly as the wavelength continuously increases. The change in optical density between colored and bleached states for $Ta_{0.1}W_{0.9}O_{2.95}$ and $Ta_{0.3}W_{0.7}O_{2.85}$ is only about 50% and about 7% of that of $WO_3$ film. This means that to achieve the same amount of light absorption at the same applied voltage, the thickness of $Ta_{0.1}W_{0.9}O_{2.95}$ and $Ta_{0.3}W_{0.7}O_{2.85}$ films needs to be twice and 14 times, respectively, the thickness of $WO_3$ films.

Coloration efficiency, which is defined as the change on optical density per unit of inserted charge, gives the optical modulation of a film at $H^+$ ion intecalation/deintecalation. At λ=633 nm, the coloration efficiency for $WO_3$, $Ta_{0.1}W_{0.9}O_{2.95}$, and $Ta_{0.3}W_{0.7}O_{2.85}$ films are 176, 146, and 52 $cm^2C^{-1}$. The spectral coloration efficiencies decreases significantly as the atomic percentage of Ta in $W_{1-x}Ta_xO_{3-x/2}$ increases from 0, 10, to 30%.

EXAMPLE 4

Cyclic Durability of $W_{1-x}Ta_xO_{3-x/2}$ Films

Durability of $WO_3$ and $W_{1-x}Ta_xO_{3-x/2}$ in acidic environment was determined from the amount of charge associated with the intercalation/deintercalation processes at various color/bleach cycles. For $WO_3$ films, the intercalation charge decreased abruptly with increase of cycle number. After 50 color/bleach cycles, the intercalation charge is only 10% of the intercalation charge of the first cycle. This means that after 83 minutes of color/bleach cycles at a frequency of 0.01 Hz in 0.1 M $H_3PO_4$, 90% of the about 250 nm thick $WO_3$ film was etched away. Much lower etching rate was found for the $W_{1-x}Ta_xO_{3-x/2}$ films. For $Ta_{0.1}W_{0.9}O_{2.95}$ film, at cycle number 50 the intercalation charge is about 90% of the intercalation charge at first cycle.

$Ta_{0.3}W_{0.7}O_{2.85}$ film showed even better performance than $Ta_{0.1}W_{0.9}O_{2.95}$. Within 45 coloring/bleaching cycles, the charge stayed almost constant. Clearly, doping of Ta into $WO_3$ results in a new electrochromic material with much better durability than $WO_3$ itself in acidic environments, and doping with 30% Ta as opposed to 10% Ta improves durability even more.

Figure 5:
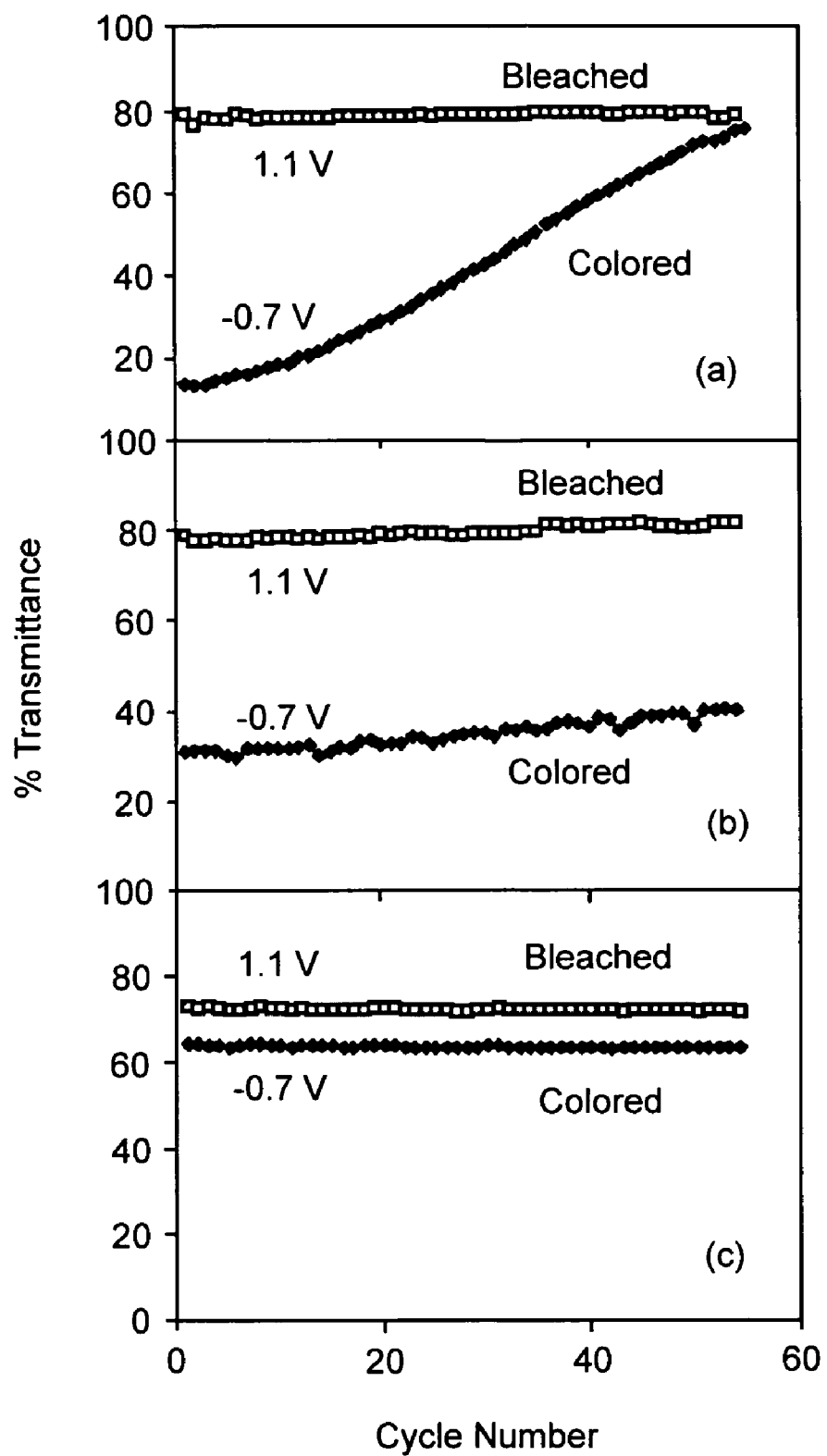
FIG. 5 shows graphs of optical transmittance vs. the number of color/bleach cycles for (a) $WO_3$, (b) $Ta_{0.1}W_{0.9}O_{2.95}$ and (c) $Ta_{0.3}W_{0.7}O_{2.85}$ films deposited at 200° C. and 5.32 Pa when subjected to $H^+$ intercalation at −0.7 V (vs. Ag/AgCl) and deintercalation at 1.1 V (vs. Ag/AgCl) in 0.1 M $H_3PO_4$. The transmittance was recorded at a wavelength of 633 nm; and, FIG. 6 is a schematic diagram of an electrochromic device.

Optical transmittance at the wavelength of 633 nm recorded at different color/bleach cycles for the amorphous $WO_3$, and $W_{1-x}Ta_xO_{3-x/2}$ films when subjected to $H^+$ intercalation at −0.7 V (vs. Ag/AgCl) and deintercalation at 1.1 V (vs. Ag/AgCl) is shown in FIG. 5. Transmittance of $WO_3$ at colored state increased as the number of color/bleach cycles increases and the value merged with the transmittance at bleached state at cycle number 55. This indicated that $WO_3$ film (about 250 nm thick) was totally etched away in 0.1 M $H_3PO_4$ solution after 55 color/bleach cycles.

Transmittance of $Ta_{0.1}W_{0.9}O_{2.95}$ at colored state increased slightly as the number of color/bleach cycles increases. The transmittance increased linearly with the cycle number and its slope is 0.187 (% Transmittance/cycle). For the transmittance becomes the same as that of $Ta_{1.0}W_{0.9}O_{2.95}$ at bleached state, it would take about 254 cycles, which means that the durability of $Ta_{0.1}W_{0.9}O_{2.95}$ film is about 4.6 times better than that of $WO_3$ film of similar thickness in 0.1 M $H_3PO_4$. Transmittance of $Ta_{0.3}W_{0.7}O_{2.85}$ at colored state stays almost constant (about 63.5) as the number of color/bleach cycles increases. Thus, $Ta_{0.3}W_{0.7}O_{2.85}$ films have superior durability to both $WO_3$ films and $Ta_{0.1}W_{0.9}O_{2.95}$ films.

Ta doped $WO_3$ has better durability and chemical stability than pure $WO_3$. Further, as the Ta content increases beyond 0.1, chemical stability and cyclic durability is improved even more. Based on X-ray diffraction studies, when the Ta content reaches 0.2 or greater, tetragonal structure gives way to cubic structure. Thus, when the Ta content is 0.2 (20%) or greater, compounds of the present invention have particularly beneficial chemical stability and cyclic durability. When the Ta content exceeds 0.5 (50%), very thick films of the electrochromic compound are required in order to get a substantial color difference between the bleached and unbleached states, thereby reducing the practicality of the compound.

EXAMPLE 5

Electrochromic Device

Figure 6:
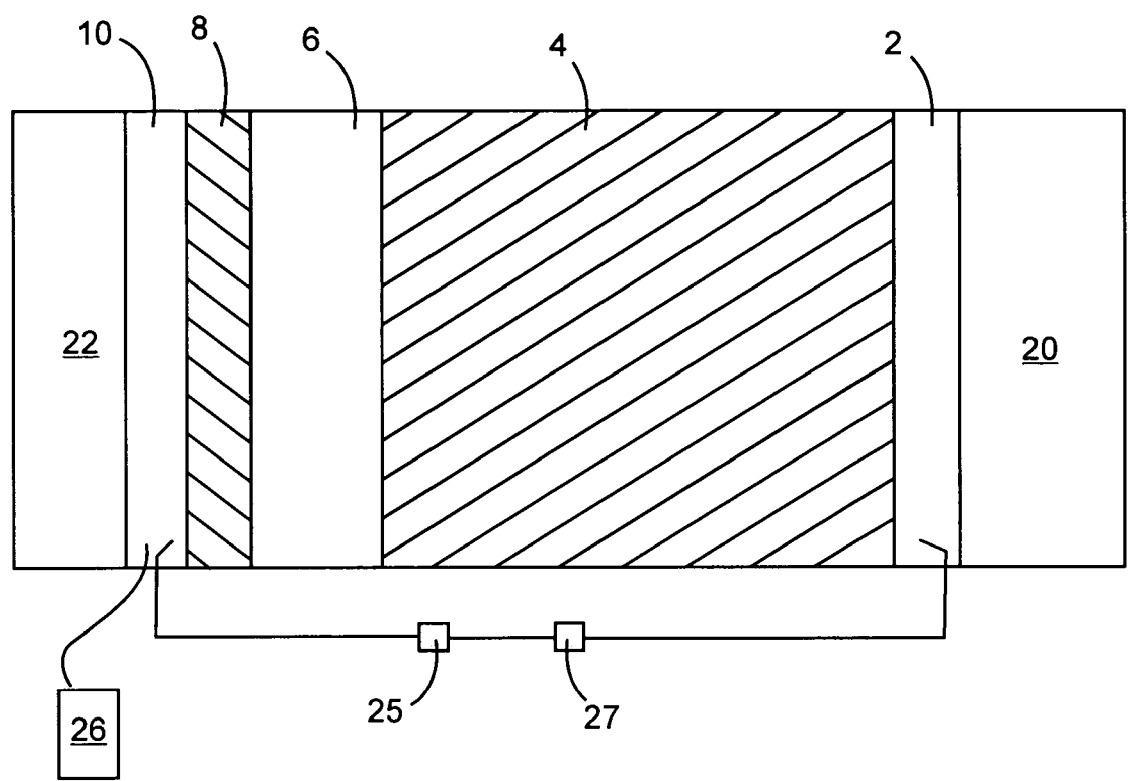

Referring to FIG. 6, a schematic section of a "smart" window is depicted in which first transparent conductor layer 2, electrochromic layer 4, ion conducting (electrolyte) layer 6, ion storage layer 8 and second transparent conductor layer 10 are sandwiched between first and second glass plates 20 and 22, respectively. Voltage source 25 is electrically connected to first transparent conductor layer 2 and second transparent conductor layer 10 in a reversible manner such that polarity of the applied voltage across the "smart" window is reversible. Second transparent conductor layer 10 is grounded by ground 26. Voltage regulator 27 permits reversal of the polarity. Voltage source 25 is capable of providing a voltage of ±1 V to ±5 V, preferably ±2 V to ±3 V.

First transparent conductor layer 2 comprises a thin film of indium-tin oxide (ITO) about 400 nm thick. Electrochromic layer 4 is a thin film of $Ta_{0.3}W_{0.7}O_{2.85}$ about 3000 nm thick. Ion conducting layer 2 comprises a thin film of poly-AMPS about 800 nm thick. Ion storage layer 8 comprises a thin film of nickel oxide (NiO) about 400 nm thick. Second transparent conductor layer 10 comprises a thin film of indium-tin oxide (ITO) about 400 nm thick.

When voltage regulator 27 is switched on to provide a negative potential in first transparent conductor layer 2, positive ions (protons) migrate from ion conducting layer 6 into electrochromic layer 4. The presence of protons in electrochromic layer 4 cause a darkening of the electrochromic layer due to the reaction:

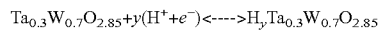

$$Ta_{0.3}W_{0.7}O_{2.85} + y(H^+ + e^-) \longleftrightarrow H_yTa_{0.3}W_{0.7}O_{2.85}$$

where $Ta_{0.3}W_{0.7}O_{2.85}$ is bleached and $H_yTa_{0.3}W_{0.7}O_{2.85}$ is colored. Subsequently reversing voltage polarity provides a negative potential in second transparent conductor layer 10, which results in the protons migrating back from electrochromic layer 4 into ion conducting layer 6 thereby reversing the above reaction and reverting the electrochromic layer to the bleached state.

Other advantages which are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A film comprising an electrochromic material comprising a single-phase electrochromic compound of formula $W_{1-x}Ta_xO_{3-x/2}$, x having value in a range of from 0.15 to 0.5.

2. The film of claim 1 having a durability at least 5 times greater than a film of $WO_3$ in a proton-based electrolyte.

3. The film of claim 1 having a durability at least 10 times greater than a film of $WO_3$ in a proton-based electrolyte.

4. The film of claim 1 having a thickness in a range of from 200 nm to 6000 nm.

5. The film of claim 1 having a thickness in a range of from 300 nm to 4000 nm.

6. The film of claim 1, wherein the compound has a cubic crystal structure.

7. An electrochromic device comprising an ion storage layer, an ion conducting layer and an electrochromic layer between first and second transparent conductor layers, the electrochromic layer comprising a film of claim 1.

8. The electrochromic device of claim 7, further comprising one or more transparent substrate layers.

9. The electrochromic device of claim 8, wherein x has a value in a range of from 0.2 to 0.5.

10. The electrochromic device of claim 9, wherein the film of electrochromic material has a durability at least 5 times greater than a film of $WO_3$ in a proton-based electrolyte.

11. The electrochromic device of claim 10, wherein the film has a thickness in a range of from 200 nm to 6000 nm.

12. The electrochromic device of claim 8, wherein the compound has a cubic crystal structure.

13. The film of claim 1, wherein x has a value in a range of from 0.2 to 0.5.

14. The film of claim 1, wherein x has a value in a range of from 0.25 to 0.35.

15. The film of claim 14, wherein the compound has a cubic crystal structure.

16. An electrochromic device comprising a nickel oxide ion storage layer, a proton-based liquid/polymer gel type ion conducting layer and an electrochromic layer between first and second transparent indium-tin oxide conducting layers, the first and second transparent indium-tin oxide conducting layers supported on first and second transparent substrates, the electrochromic layer comprising a film of an electrochromic material, the film having a thickness in a range of from 300 nm to 4000 nm, the electrochromic material comprising a single-phase compound of formula $W_{1-x}Ta_xO_{3-x/2}$ having a cubic crystal structure, x having a value in a range of from 0.2 to 0.5

17. The electrochromic device of claim 16, wherein the electrochromic layer has a durability at least 5 times greater than a film of $WO_3$ in a proton-based electrolyte.

18. The electrochromic device of claim 16, wherein the electrochromic layer has a durability at least 10 times greater than a film of $WO_3$ in a proton-based electrolyte.

19. The electrochromic device of claim 16, wherein the electrochromic layer has a colored state having a neutral color pleasing to a human eye.

* * * * *